(12) United States Patent
Burckart et al.

(10) Patent No.: US 7,698,411 B2
(45) Date of Patent: Apr. 13, 2010

(54) SELECTIVELY DELIVERING CACHED CONTENT OR PROCESSED CONTENT TO CLIENTS BASED UPON A RESULT COMPLETED PERCENTAGE

(75) Inventors: Erik J. Burckart, Raleigh, NC (US);
Curtiss J. Howard, Raleigh, NC (US);
Todd E. Kaplinger, Raleigh, NC (US);
Stephen J. Kenna, Morrisville, NC (US); Erinn E. Koonce, Durham, NC (US); Maxim A. Moldenhauer, Durham, NC (US)

(73) Assignee: International Business Machines Corporation, Armonk, NY (US)

( * ) Notice: Subject to any disclaimer, the term of this patent is extended or adjusted under 35 U.S.C. 154(b) by 209 days.

(21) Appl. No.: 11/844,894

(22) Filed: Aug. 24, 2007

(65) Prior Publication Data

US 2009/0055468 A1 Feb. 26, 2009

Related U.S. Application Data

(63) Continuation-in-part of application No. 11/843,038, filed on Aug. 22, 2007.

(51) Int. Cl.
G06F 15/173 (2006.01)
G06F 15/16 (2006.01)
(52) U.S. Cl. ............... 709/223; 709/217; 709/226
(58) Field of Classification Search ............. 709/201, 709/205, 217, 223, 226
See application file for complete search history.

(56) References Cited

U.S. PATENT DOCUMENTS

| | | | | |
|---|---|---|---|---|
| 5,944,779 A * | 8/1999 | Blum | ............... | 709/201 |
| 6,112,243 A * | 8/2000 | Downs et al. | ............... | 709/226 |
| 6,505,257 B2 * | 1/2003 | Murata et al. | ............... | 710/8 |
| 6,651,143 B2 * | 11/2003 | Mounes-Toussi | ............... | 711/138 |
| 6,665,704 B1 | 12/2003 | Singh | | |
| 6,961,776 B1 | 11/2005 | Buckingham et al. | | |
| 6,963,917 B1 * | 11/2005 | Callis et al. | ............... | 709/227 |
| 7,127,713 B2 | 10/2006 | Davis et al. | | |
| 7,130,885 B2 | 10/2006 | Chandra et al. | | |
| 7,209,915 B1 | 4/2007 | Taboada et al. | | |
| 7,398,301 B2 | 7/2008 | Hennessey et al. | | |
| 7,447,731 B2 | 11/2008 | Calo et al. | | |
| 7,502,760 B1 * | 3/2009 | Gupta | ............... | 705/66 |
| 7,536,472 B2 | 5/2009 | O'Neal et al. | | |
| 7,590,752 B2 | 9/2009 | Van Oldenborgh et al. | | |
| 2002/0111814 A1 * | 8/2002 | Barnett et al. | ............... | 705/1 |

(Continued)

*Primary Examiner*—Hussein Elchanti
(74) *Attorney, Agent, or Firm*—Patents on Demand, P.A.; Brian K. Buchheit

(57) ABSTRACT

The present invention discloses a solution of a server-side result distribution service software program. The program can receive and store results related to a request context from different content providing servers. Asynchronous requests can be received from a client, which initiated a content request that defines the request context. A level of completeness for the request results that satisfies the received client request can be determined. The level of completeness can be compared against a previously established threshold. Either dynamically processed results or previously cached results can be delivered to the client depending upon an outcome of the comparing step. Server-side operations that produce the dynamically processed results can be operations initiated after the content request is sent by the client. Previously cached results can be generated from processes initiated before the content request is sent by the client.

15 Claims, 2 Drawing Sheets

U.S. PATENT DOCUMENTS

| | | |
|---|---|---|
| 2004/0103413 A1* | 5/2004 | Mandava et al. ............ 718/100 |
| 2004/0205108 A1* | 10/2004 | Tanaka ...................... 709/201 |
| 2004/0264385 A1 | 12/2004 | Hennessey et al. |
| 2005/0044233 A1 | 2/2005 | Cai et al. |
| 2005/0125508 A1 | 6/2005 | Smith et al. |
| 2005/0198118 A1 | 9/2005 | Viger et al. |
| 2007/0143460 A1 | 6/2007 | Ben-David et al. |
| 2007/0226342 A1* | 9/2007 | Apelbaum .................. 709/226 |
| 2009/0063618 A1 | 3/2009 | Chetuparambil et al. |

* cited by examiner

SELECTIVELY DELIVERING CACHED CONTENT OR PROCESSED CONTENT TO CLIENTS BASED UPON A RESULT COMPLETED PERCENTAGE

CROSS-REFERENCE TO RELATED APPLICATIONS

This continuation-in-part application claims the benefit of U.S. patent application Ser. No. 11/846,423, filed Aug. 28, 2007, the benefit of U.S. patent application Ser. No. 11/843,038 filed Aug. 22, 2007, and the benefit of U.S. patent application Ser. No. 11/851,092, filed Sep. 6, 2007, which are incorporated by reference herein.

BACKGROUND

1. Field of the Invention

The present invention relates to HTTP request handling and, more particularly, to selectively delivering cached content or processed content to clients based upon a result completed percentage.

2. Description of the Related Art

It can be beneficial for a server to send a cached response as a substitute for a processed response. That is, a server can immediately convey a cached response to a client, so that the client does not have to wait for a processed response and so that server processing resources are conserved. Extensions to content caching technologies (e.g., stale-while-revalidate HTTP Cache-Control Extension and the Coral Content Distribution Network) exist that establish a time period for which cached content is valid. After this time period, a stale response can be sent while a processing server queries to determine if the request is valid and replaces the cached content as necessary. This extension has an explicit time limit and does not update the request that originally triggered the revalidation. Additionally, systems exist that establish a processing time-out period, where once the time-out period passes, cached content is provided in place of processed content.

Server-side systems are emerging that asynchronously process content for a single request context. These systems can use multiple servers to process the asynchronous request and can perform client-side content aggregation. For example, U.S. patent application Ser. No. 11/846,423, filed Aug. 28, 2007, disclosed a solution for client side aggregation of asynchronous context-sensitive request operations in a single application server environment. A concept of client-side content aggregation is extended by U.S. patent application Ser. No. 11/843,038 filed Aug. 22, 2007, which teaches client-side aggregation of context-sensitive request results where results are asynchronously handled by multiple servers. Additionally, U.S. patent application Ser. No. 11/851,092, filed Sep. 6, 2007 teaches a solution for sharing server generated response output to satisfy request for content originated by different clients that can be used in conjunction with the present inventive arrangements.

Conventional content caching techniques would have difficulty handling situations where there are many requests/results produced for a single request context, where each of the asynchronous requests would have different expected response times. Use of a single time-out rule for providing cached results instead of processed results would be inappropriate due to these differing expected response times. An expected solution to these difficulties would be to establish a complex cache configuration for a request context, where each asynchronous result has a characteristic response time-out threshold. Another expected solution would be to conglomerate many operations together and establish a single time-out for these conglomerated operations. Each of these solutions incurs overhead costs and has many inherent flaws. What is needed is a new technique for handling cached content.

SUMMARY OF THE INVENTION

The present invention discloses a solution to selectively use either cached content or processed content based upon a result's percentage complete. More specifically, a request receiving server can process the client request using multiple asynchronous operations, where results of operations can be delivered to a result service once completed. The operations can also convey percentage complete messages to the result service. When an entity requests content from the result service the result service can first determine whether results are completed, returning results in response if so. Otherwise, the result service can determine a percentage of completion. When this percentage is under a designated completion threshold, cached results can be returned. When the percentage complete is over the threshold, the service can wait until the operation is complete and then return processed results. Each time results are processed, the cache can be updated. In one embodiment, the percentage based cache return can be applied to shared processes (e.g., U.S. patent application Ser. No. 11/851,092).

It should be appreciated, that using the percentage complete for selective cache returns inherently compensates for different asynchronous processes having different expected response times. Use of a percentage, permits grouping of related processes or individual process handling. Generally, the disclosed solution is superior to conventional cache management techniques, which are based on one or more fixed time-out values. The solution can handle asynchronous results (as well as synchronous results) produced for a single request context, whether processed by a single server or by multiple servers. Moreover, the percentage based caching solution can be used where content is aggregated client-side or server-side.

The percentage complete can be determined using a variety of programming techniques. For example, a historical log of average completion times for a process can be maintained and this average can be used to estimate an amount of time a current process should take to complete compared to an amount of time already taken. The percentage complete can be determined from these time calculations. In another example, the server-side process can include a number of embedded milestones, which are reported as processing occurs, which can be used to determine the percentage complete.

The present invention can be implemented in accordance with numerous aspects consistent with the material presented herein. For example, one aspect of the present invention can include a server-side result distribution service software program. The program can receive and store results related to a request context from different content providing servers. Asynchronous requests can be received from a client, which initiated a content request that defines the request context. A level of completeness for the request results that satisfies the received client request can be determined. The level of completeness can be compared against a previously established threshold. Either dynamically processed results or previously cached results can be delivered to the client depending upon an outcome of the comparing step. Server-side operations that produce the dynamically processed results can be operations initiated after the content request is sent by the client. Previously cached results can be generated from processes initiated before the content request is sent by the client.

Another aspect of the present invention can include a method for selectively using cached results to handle requests based upon a level of completeness. In the method, a server-side result service can receive a client-side request for content. The content can include a result produced by a server-side resource that delivers produced results to the server-side result service. For example, the service-side resource can be one of many Web servers, which handle asynchronous requests for a single request context. A level of completeness (e.g., a completed percentage) of a processing operation that ultimately produces the result can be determined using a variety of programming techniques (e.g., historical based processing averages, software embedded completion milestones, etc.). Either a cached response to the client-side request or a dynamically produced response to the client-side request can be provided to the requesting client based upon the determined level of completeness.

Still another aspect of the present invention can include a method for selectively delivering cached content or processed content to clients based upon a result completed level. The method can include a step of a Web server receiving a RESTful request for content from a client. A RESTful command is a one conforming to the Representational State Transfer (REST) architecture. A set of asynchronous operations, which together satisfy the RESTful request, can be initiated. Operation results can be delivered to the result service. The result service can receive at least one RESTful request from the client for operation results. The result service can selectively deliver cached content or content processed responsive to the RESTful request to the client based upon a percentage completed level of the asynchronous operations that produce the operation results.

For example, when the level of completeness indicates that an operation result is complete, the completed operation result can be conveyed to the client. When the level of completeness is greater than a previously established threshold, the method can wait for the operation result to be processed, and can then provide the completed operation result to the client. When the level of completeness is not greater than the previously established threshold, cached content can be provided to the client.

It should be noted that various aspects of the invention can be implemented as a program for controlling computing equipment to implement the functions described herein, or as a program for enabling computing equipment to perform processes corresponding to the steps disclosed herein. This program may be provided by storing the program in a magnetic disk, an optical disk, a semiconductor memory, or any other recording medium. The program can also be provided as a digitally encoded signal conveyed via a carrier wave. The described program can be a single program or can be implemented as multiple subprograms, each of which interact within a single computing device or interact in a distributed fashion across a network space.

BRIEF DESCRIPTION OF THE DRAWINGS

There are shown in the drawings, embodiments which are presently preferred, it being understood, however, that the invention is not limited to the precise arrangements and instrumentalities shown.

DETAILED DESCRIPTION OF THE INVENTION

Figure 1:
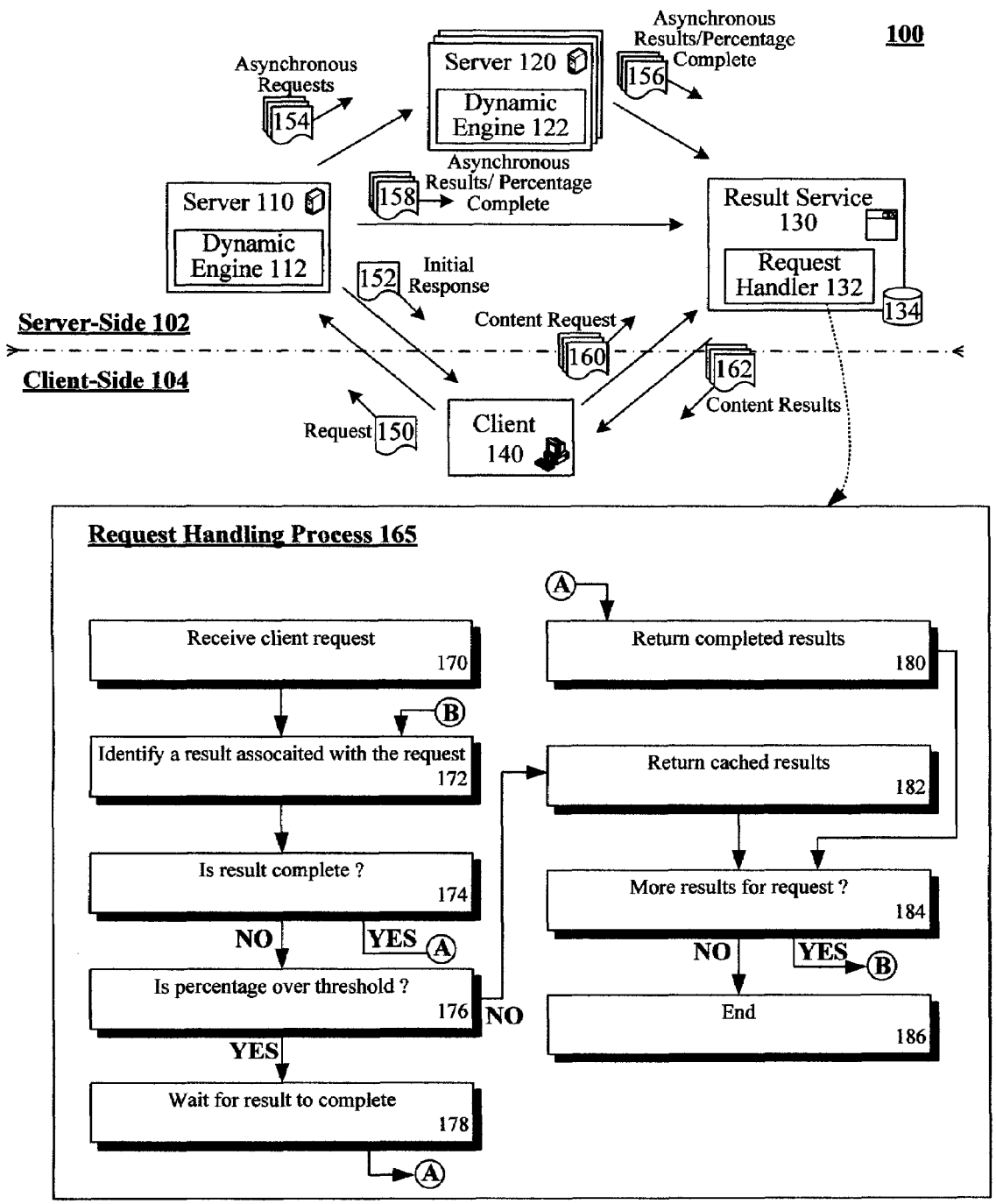
FIG. 1 illustrates a schematic diagram of a system in which client requests selectively return cached content or dynamically processed content based upon what percentage of processing has been completed by a server.

FIG. 1 illustrates a schematic diagram of a system 100 in which client requests selectively return cached content or dynamically processed content based upon what percentage of processing has been completed by a server. The percentage based request handling can be applied to any number of request-response paradigms. These paradigms can include a set of asynchronously handled processes for a common request context (shown) or synchronously handled requests. Additionally, client-side aggregation of content (shown) or server-side aggregation of content can both be handled by the percentage based request handler 132. Basically, the request handler 132 can be implemented in any environment, where cached content 134 can selectively be conveyed to a requesting client 140 when one set of system 100 conditions exist, and where dynamic content can be conveyed to a requesting client 140 when a different set of conditions exist.

More specifically, the request handler 132 can include a set of programmatic instructions that implements the request handling process 165. Process 165 assumes that a client is requesting content associated with a previously issued request for which processing has been initiated. Process 165 can begin in step 170, where a client request is received. In step 172, a result associated with the request can be identified. In step 174, the process can determine whether a completed result for the request exists. If so, the process can return completed results in step 180.

If results have not completed processing, the process can proceed from step 174 to step 176, where a completed percentage of the result can be compared against a previously established threshold. When the percentage is not over the threshold, the method can proceed from step 176 to step 182, where cached results can be returned. When the percentage is over the threshold, the process can wait for result completion in step 178. Completed results can be returned in step 180. Although not explicitly shown in process 165, the completed results of step 180 can be written to the cache for use when handling subsequent requests for the same content.

After a set of results have been returned in either step 180 or 182, the method can proceed to step 184 where a check for more results can be performed. When more results are associated with the request (step 170), the process can proceed from step 184 to step 172, where a next result can be identified and handled.

When no more results exist in step 184, the process can end in step 186. In one optional implementation (not shown), an automatic refresh loop can be established to refresh returned cached content (step 182) with completed content (180) once the completed content (180) has been generated. The refresh loop can be handled by a client-side program, where content requests are intermittently issued to a result service until non-cached, completed content is returned. The optional refresh loop can also be handled by a server-side process, which pushes completed content to clients that have previously received results from a cache.

One context in which the request handler 132 can be implemented performs client-side 104 aggregation of server-side 102 content that has been asynchronously handled. In this illustrated context, a client 140 can request 150 content from server 110. The server 110 can immediately provide an initial response 152, which can include static content that contains a set of placeholders to be filled with dynamic content when available. The client 140 can immediately display the initial content 152 or can delay until the placeholder content is received, depending on implementation specifics.

The server 110 can issue numerous asynchronous requests 154 to one or more servers 120 to handle. Each of these servers 120 can include a dynamic engine 122, which generates results 156 that are conveyed to a result service 130. The dynamic engine 122 can determine a percentage complete 156, which is conveyed to the result server 130 either automatically at certain processing points or responsive to service 130 issued queries. In one embodiment, the server 110 can include a dynamic engine 112 that generates asynchronous results and completion percentages 158 that are conveyed to the result service 130. Accordingly, the service 130 can be utilized in a system including one (server 110) or more (servers 120) result handling servers.

The dynamic engines 112 and/or 122 can utilize a plurality of different programming techniques to determine a level of completeness or a percentage complete 156. For example, a historical log of average completion times for a process can be maintained and this average can be used to estimate an amount of time a current process should take to complete compared to an amount of time already taken. The percentage complete can be determined from these time calculations. Additional factors can be incorporated to improve an accuracy of the percentage complete calculations, such as server load, available memory/resources, a complexity of a request being processed, a time of day/day of week of the processing, and the like. When a time-average calculation is performed, the historical data and percentage determinations can be performed directly by the result service 130 and need not be performed by a server 110, 120 that is actually performing the processing operation.

In another example, the server-side program that handles the requests 154 can include a number of software embedded completion milestones, which are reported as processing occurs, which can be used to determine the percentage complete. For instance, a server-side program can include ten different "evenly spaced" milestones, each representing that one tenth of a processing operation has been completed. As each milestone is achieved, the associated percentage completed can be increased by ten percent. The above examples are just two of many techniques that can be utilized to calculate the percentage complete and the invention is not to be construed as limited in this regard.

At some point after the initial request 150 was conveyed, the client 140 can request 160 content from the result service 130. The result service 130 can selectively return content results 162 in response to the requests 160. The results 162 can be asynchronously returned. The results 162 can be associated with returned results 156 from servers 120 and/or returned results 158 from server 110. As shown by process 165, the results 162 can include cached results from data store 134, when a complete percentage of a requested result is below an established threshold. In various implementations, the cached results can be accepted by client 140 as a final result, the client 140 can continuously request 160 content until a processed result 156, 158 (non-cached) is received, and/or the service 130 can return an update (processed result) to a cached return, when available.

In system 100, the servers 110-120 can be computing systems capable of handling Hypertext Transfer Protocol (HTTP) requests from a network and of providing HTTP responses to these requests. Each of the servers 110-120 can be associated with a Uniform Resource Identifier (URI) used for server 110-120 identification when conveying HTTP requests. The HTTP responses can include static and dynamic content. Typically, the initial response 152 produced by server 110 will include static content and one or more placeholders. Placeholder content can be produced by the servers 120, which includes dynamic content. Each of the servers 110-120 can include numerous optional features, such as authentication support, encrypted channel support (e.g., HTTPS support through Transport Layer Security (TLS) technologies, Secure Sockets Layer (SSL) technology, and the like), content compression and decompression support, and the like. Each of the servers 110-120 can allocate resources to process a received request 150, 154 and can release these resources once that server's processing tasks are completed. That is, a time period in which any of the servers 110-120 is used to handle the request context is less than a total time needed to handle the request context. The servers 110-120 can be implemented within physical machines as well as virtual computing devices, such as those provided through virtualization solutions (e.g., VMWARE, MS VIRTUAL SERVER, and the like).

The servers 110-120 can be either a public or a private servers. In one embodiment, server 110 can be a public server 110 and one or more of the servers 120 that an asynchronous process request 154 can be private servers that are not directly accessible over a public network. The private servers can be firewall protected, can be part of a virtual private network (VPN) linked to the server 110, and can be part of a private network that server 110 is permitted to access. Additionally, although system 100 shows that each request 154 issued by server 110 is handled by a single server 120, which provides results to service 130, other arrangements are contemplated. For example, server 120 can initially process request 154, can convey results to an intermediate server (not shown) for further processing, and the intermediate server can send results to the service 130.

The result service 130 can be a server-side 102 software program able to handle HTTP and other RESTful messages. A RESTful message is a message conforming to the Representational State Transfer (REST) software architecture. A REST architecture provides a uniform interface exists that includes a few basic primitive commands (e.g., HTTP GET, HTTP PUT, HTTP POST, HTTP DELETE). REST based solutions simplify component implementation, reduce the complexity of connector semantics, improve the effectiveness of performance tuning, and increase the scalability of pure server components.

The result service 130 can be implemented as a servlet, a JAVA Server Page (JSP), an Active Server Page (ASP), an Enterprise Java Bean (EJB), an Enterprise Service Bus (ESB) service, and the like. The service 130 can be associated with a URI to which the servers 110-120 can convey responses 156, 158 and to which the client 140 can convey the request 160. The result distribution service 130 can reside within server 110, server 120, or any other server. When the service 130 is associated with a component other than the one addressed in the original HTTP request, then system 100 must implement measures to ensure that the URLs of the service 130 are available to the servers 110-120 and the client 140.

The client 140 can be any computing device capable of sending HTTP request 150 and capable of rendering responses to these requests. For example, the client 140 can include a personal computer, a notebook computer, a mobile computing device, a smart phone, a personal data assistant (PDA), an embedded computing device, an electronic gaming system, and the like. Client 140 can include a browser, which handles HTTP communications. The browser can be linked to an interface with which a user interacts with client 140. The interface can be a graphical user interface (GUI), a multi-modal interface, a voice user interface (VUI), and the like. Interface can include content and placeholders.

In one implementation, the client-side 104 aggregation of content can occur in a user transparent fashion. For example, a client browser can be enhanced with a plug-in or extension that automatically submits the requests 160 until responses 162 are received. In one embodiment, the server 110 can convey an address of the service 130 to the client 140 and to the servers 120, so that each computing device is able to determine a target for requesting (e.g., client 140) and/or delivering (e.g., servers 120) content. In another embodiment, the server 110 can convey a user identifying address to the servers 120, which are in turn conveyed to the service 130. The service 130 can then deliver results 162 to the client 140 referenced by the address and/or the service 130 can then convey a message to the client 140 so that the client 140 knows where to send requests 160.

The various components of system 100 can be communicatively linked via a network (not shown). The network can include components capable of conveying digital content encoded within carrier waves. The content can be contained within analog or digital signals and conveyed through data or voice channels and can be conveyed over a personal area network (PAN) or a wide area network (WAN). The network can include local components and data pathways necessary for communications to be exchanged among computing device components and between integrated device components and peripheral devices. The network can also include network equipment, such as routers, data lines, hubs, and intermediary servers which together form a packet-based network, such as the Internet or an intranet. The network can further include circuit-based communication components and mobile communication components, such as telephony switches, modems, cellular communication towers, and the like. The network can include line based and/or wireless communication pathways.

The data store 134 and other data stores (not shown) linked to servers 110-120 or client 140 can be physically implemented within any type of hardware including, but not limited to, a magnetic disk, an optical disk, a semiconductor memory, a digitally encoded plastic memory, a holographic memory, or any other recording medium. Data store 134 can be a stand-alone storage unit as well as a storage unit formed from a plurality of physical devices which may be remotely located from one another. Additionally, information can be stored within the data store 134 in a variety of manners. For example, information can be stored within a database structure or can be stored within one or more files of a file storage system where each file may or may not be indexed for information searching purposes. Information stored in data store 134 can also be optionally encrypted for added security.

Although system 100 illustrates one contemplated arrangement of the invention, the invention is not to be limited to the precise arrangements shown. Instead, the disclosed solution can be performed in any system in which a level of completeness is used to determine whether cached results or processed results are returned to clients 140. For example, the client issued request 150 can be synchronously handled by server-side 102 components. The client can still issue a request 160 for the content (such as when a significant delay has occurred and no results have been returned) and results 162 can be returned, which are either previously cached results or newly processed results depending on a calculated level of completion. In a different derivative, instead of a client issuing request 160, a server-side 102 component can determine whether to send cached results or processed results (based on a level of completion) whenever a server-side timer indicates that results are to be returned to the client 140 for the request 150.

Figure 2:
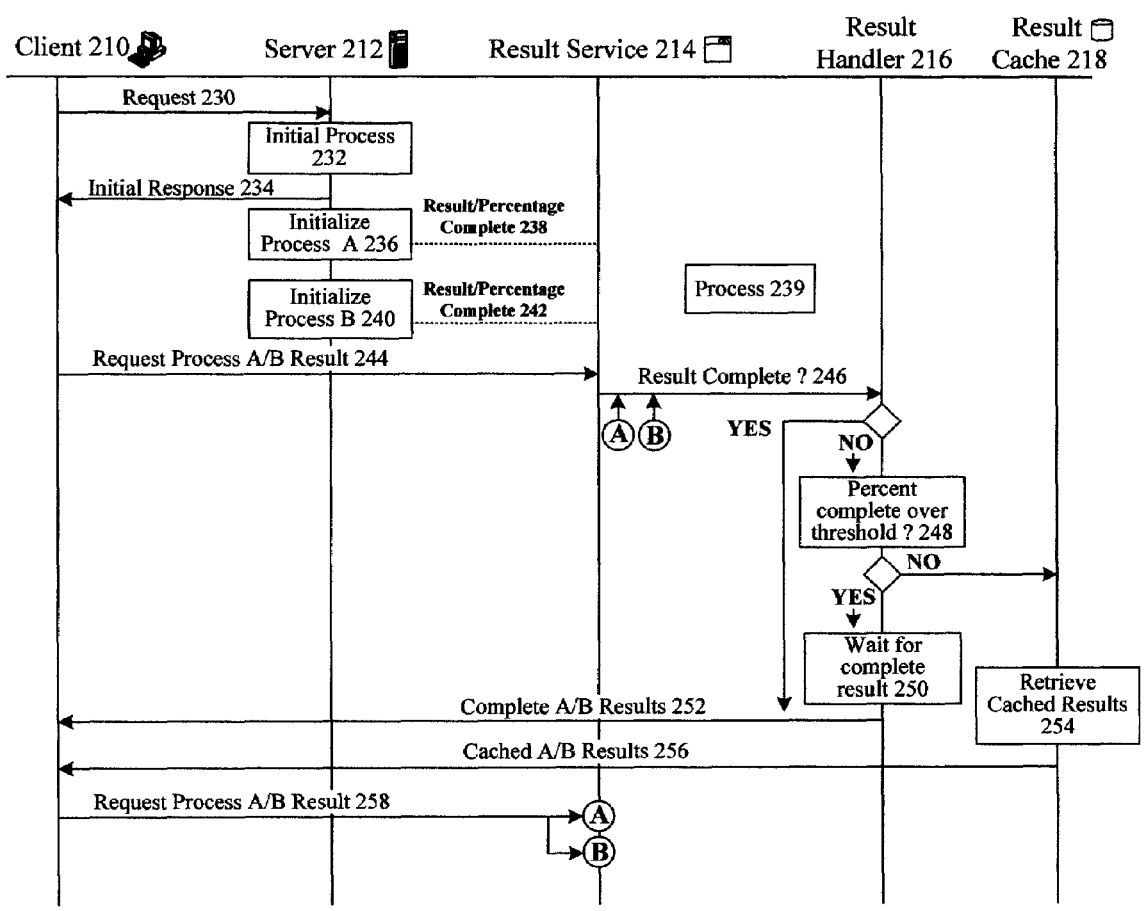
FIG. 2 is a flow diagram showing interactions where either cached content or dynamically processed content is delivered to clients based upon a result completed percentage in accordance with an embodiment of the inventive arrangements disclosed herein.

FIG. 2 is a flow diagram 200 showing interactions where either cached content or dynamically processed content is delivered to clients based upon a result completed percentage in accordance with an embodiment of the inventive arrangements disclosed herein. The diagram 200 shows message flows in a context of a system 100 and/or in the context of an environment cable of performing request handling process 165.

In diagram 200, a client 210 can convey a request 230 to server 212. The server 212 can initially process 232 the request. The processing 232 an optionally produce an initial response 234, such as static content that includes placeholders for asynchronously handed dynamic content. In another embodiment (not shown) all the content produced for request 230 can be asynchronously produced dynamic content, in which case no initial response 234 will be generated and conveyed.

The request handling process 232 can also cause the server 212 to spawn processes/threads for a first process 236 (Process A) and for a second process 240 (Process B). These processes 236, 240 can produce results 238, 242 that are conveyed to a result service 214. Completion percentages for the processes 236, 240 can also be conveyed to the service 214, possibly in response to a completion query (not shown) from the service 214. The showing of two processes 236, 240 for the request 230 is arbitrary, and the request 230 can be handled using any number of asynchronous processes. Additionally, each process 236, 240 can be handled by server 212 or by one or more remotely located servers (not shown).

The client 210 can query 244 the result service 214 for results to request 230. In one implementation, a single query 244 can request results for Processes A and B. In another embodiment, multiple asynchronous queries 244 can be issued for results from each Process A and B. Upon receiving a request 244, the service 214 can check with the result handler 216 to determine if results for the processes have completed. If so, the result handler 216 can return completed results 252 to the client. If results are not complete, the result handler 216 can determine 248 whether a percentage complete for a process is over a designated threshold. Messages (not shown) can be exchanged between the result handler 216 and a process handling server (236, 240) at this step so that a current percentage is used in step 248. When the completed percentage exceeds the threshold, the handler 216 can delay 250 for the results to complete, and can send 252 completed results to the client 210. When the threshold is not reached, results can be retrieved 254 from a result cache 218, and conveyed 256 to the client 210.

The message flow shown by elements 244-256 can be repeated for each process (Process A and B) in the request context. When cached results 256 are received, the client can, after an arbitrary delay, again request 258 processing results. When a portion of a return was from a cache and another portion from a result 230 triggered process, only the cached return need be re-requested in request 258. For example, when Process A is obtained from a previous cache return, the flow can loop to message 246 where a result completion message 246 for Process A can be conveyed to the result handler 216. When process B is obtained from a previous cache return, the flow can loop to message 246 where a result completion message 246 for Process B can be conveyed to the result handler 216.

The system 100, process 165, and message flows 200 expressed herein illustrate a solution for selectively utilizing cached content and derivatives to specific illustrated mechanisms are contemplated herein. For example, instead of using a completed percentage, a normalized completion score can be used to produce an equivalent result. Hence, the term completed percentage as used herein is to be broadly interpreted to include any mathematical value indicative of a level of processing completeness.

The present invention may be realized in hardware, software, or a combination of hardware and software. The present invention may be realized in a centralized fashion in one computer system or in a distributed fashion where different elements are spread across several interconnected computer systems. Any kind of computer system or other apparatus adapted for carrying out the methods described herein is suited. A typical combination of hardware and software may be a general purpose computer system with a computer program that, when being loaded and executed, controls the computer system such that it carries out the methods described herein.

The present invention also may be embedded in a computer program product, which comprises all the features enabling the implementation of the methods described herein, and which when loaded in a computer system is able to carry out these methods. Computer program in the present context means any expression, in any language, code or notation, of a set of instructions intended to cause a system having an information processing capability to perform a particular function either directly or after either or both of the following: a) conversion to another language, code or notation; b) reproduction in a different material form.

This invention may be embodied in other forms without departing from the spirit or essential attributes thereof. Accordingly, reference should be made to the following claims, rather than to the foregoing specification, as indicating the scope of the invention.

What is claimed is:

1. A method for selectively using cached results to handle requests based upon a level of completeness comprising:
    a server comprising hardware receiving an original request for content;
    said server initiating a plurality of asynchronous operations to satisfy the original request, wherein one of the asynchronous operations is a processing operation;
    a server-side result service, which is a computer program product stored on a storage medium and executable by computing equipment, receiving a client-side request for content, said content comprising a result produced by a server-side resource, which comprises a computer program product stored on a storage medium and executable by computing equipment, that delivers produced results to the server-side result service;
    determining by having computing equipment execute a computer program product a level of completeness of the processing operation that ultimately produces the result; and
    selectively providing either a cached response to the client-side request or a dynamically produced response to the client-side request based upon the determined level of completeness;
    when the determining step indicates that the processing operation is complete, computing equipment providing the dynamically produced response that comprises the result from the processing operation;
    when the processing operation is executing when the client-side request for content is received, computing equipment comparing the level of completeness against a previously established threshold;
    when the level of completeness is greater than the threshold, computing equipment waiting for the processing operation to complete, and upon completion, computing equipment providing the dynamically produced response that comprises the result from the processing operation; and
    when the level of completeness is not greater than the threshold, computing equipment providing the cached response.

2. The method of claim 1, wherein the previously established threshold is a configurable value, established by a request issuing client.

3. The method of claim 1, wherein the result service is a server-side program stored in a storage medium configured to handle RESTful requests, wherein the processing operation is handled by a Web server, wherein the client-side request is a HTTP request issued from a client browser.

4. The method of claim 1, further comprising:
    a client comprising hardware, issuing the client-side request to a request receiving server, said client-side request defining a request context;
    a request receiving server comprising hardware, issuing a plurality of asynchronous requests for the request context;
    the server-side result service receiving results of processing the asynchronous requests, wherein the server-side result service is a server-side program configured to handle RESTful requests; and
    the server-side result service providing the client with the received results, wherein the client aggregates results for the request context.

5. The method of claim 1, wherein the server-side result service initially provides the client with at least one cached result in accordance with the providing step, and wherein the server-side result service subsequently updates the cached result by providing the client with an equivalent received result.

6. The method of claim 1, wherein said result is a synchronously processed result produced by the server-side resource for the client-side request.

7. The method of claim 1, wherein said result is one of a plurality of asynchronously processed results produced for a single request context.

8. The method of claim 7, wherein the plurality of asynchronously processed results are produced by different servers.

9. The method of claim 8, wherein the asynchronously processed results are aggregated by a client, which comprises hardware, that originally issued a client request that established the single request context.

10. The method of claim 1, wherein said steps of claim 1 are steps performed automatically by at least one machine in accordance with at least one computer program having a plurality of code sections that are executable by the at least one machine, said at least one computer program being stored in a machine readable storage medium.

11. A method for selectively delivering cached content or processed content to clients based upon a result completed level comprising:
    a Web server, which comprises hardware, receiving a RESTful request for content from a client, which comprises hardware;
    initiating a plurality of asynchronous operations, which together satisfy the RESTful request;

delivering operation results to a result service, which is a computer program product stored on a storage medium and executable by computing equipment;

the result service receiving at least one RESTful request from the client for operation results;

the result service determining a level of completeness of a processing operation that ultimately produces the operation results for the RESTful request received by the result service;

when the level of completeness indicates that an operation result is complete, the result server providing the operation result to the client;

when the level of completeness is greater than a previously established threshold, the result server waiting for the operation result to be processed, and after the waiting providing the operation result to the client; and when the level of completeness is not greater than the previously established threshold, the result server providing the cached content to the client, wherein the result service selectively delivers cached content or content processed responsive to the RESTful request to the client based upon a result completed level of the asynchronous operations that produce the operation results.

12. The method of claim 11, wherein the result completed level is a completed percentage.

13. A result distribution service comprising a set of machine readable instructions stored in a machine readable storage medium, which is a physical storage medium comprising hardware, wherein said set of machine readable instructions are executable by at least one machine, which comprises hardware, causing the at least one machine to perform the steps of:

receiving and storing results related to a request context from a plurality of different content providing servers, wherein each different content providing server comprises hardware executing at least one computer program product;

receiving a plurality of asynchronous requests from a client, which initiated a content request that defines the request context, wherein said client comprises hardware executing at least one computer program product;

responsive to each received client request, determining a level of completeness for the request result that satisfies the received client request;

comparing the level of completeness against a previously established threshold;

when the level of completeness indicates that the request result is complete, providing the completed result to the client;

when the level of completeness is greater than the previously established threshold, waiting for the request result to be completely processing, and providing the completed result to the client; and when the level of completeness indicates that the request result is not greater than the previously established threshold, providing the previously cached result to the client, wherein the result distribution services conveys either a dynamically processed result or a previously cached result depending upon an outcome of the comparing step, wherein server-side operations that produce the dynamically processed results are initiated after the content request is sent by the client, and wherein previously cached results result from processes initiated before the content request is sent by the client.

14. The result distribution service of claim 13, wherein the result distribution service is a software program stored in a storage medium configured to respond to RESTful requests, and wherein the level of completeness is a completed percentage.

15. The result distribution service of claim 13, wherein each of the received results is conveyed to the result distribution service within asynchronous HTTP messages, wherein each of the asynchronous requests from the client are specified within asynchronous HTTP messages, wherein the conveyed results are provided to the client within asynchronous HTTP messages.

* * * * *